United States Patent
Zitkovic, Jr. et al.

(10) Patent No.: US 10,675,970 B2
(45) Date of Patent: Jun. 9, 2020

(54) VEHICLE CAPLESS REFUELING SYSTEM

(71) Applicant: Ford Global Technologies, LLC, Dearborn, MI (US)

(72) Inventors: Michael Terrence Zitkovic, Jr., Dearborn, MI (US); Xiankai Song, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 848 days.

(21) Appl. No.: 15/237,339

(22) Filed: Aug. 15, 2016

(65) Prior Publication Data

US 2018/0043767 A1 Feb. 15, 2018

(51) Int. Cl.
*B60K 15/04* (2006.01)
*B60K 15/035* (2006.01)
*B60K 15/05* (2006.01)

(52) U.S. Cl.
CPC .... *B60K 15/0406* (2013.01); *B60K 15/03504* (2013.01); *B60K 15/04* (2013.01); *B60K 2015/0429* (2013.01); *B60K 2015/0458* (2013.01)

(58) Field of Classification Search
CPC .......... B60K 15/0406; B60K 15/03504; B60K 15/04; B60K 2015/0429; B60K 2015/0458
USPC ................................................ 220/86.2, 86.1
See application file for complete search history.

(56) References Cited

U.S. PATENT DOCUMENTS

| | | | |
|---|---|---|---|
| 5,056,570 A | 10/1991 | Harris et al. | |
| 5,103,877 A | 4/1992 | Sherwood et al. | |
| 5,271,438 A | 12/1993 | Griffin et al. | |
| 5,791,387 A * | 8/1998 | Palvolgyi | B60K 15/05 141/301 |
| 6,029,719 A * | 2/2000 | Hor | B60K 15/035 137/588 |
| 6,102,234 A * | 8/2000 | Kremer | B60K 15/04 137/312 |
| 6,155,316 A * | 12/2000 | Benjey | B60K 15/04 141/302 |
| 6,446,826 B1 | 9/2002 | Foltz et al. | |
| 6,539,990 B1 | 4/2003 | Levey et al. | |
| 6,968,874 B1 | 11/2005 | Gabbey et al. | |
| 6,994,130 B1 | 2/2006 | Gabbey et al. | |
| 7,926,522 B2 | 4/2011 | Aitken et al. | |
| 8,550,128 B2 * | 10/2013 | Mitrovich | B67D 7/005 137/413 |
| 8,776,845 B2 * | 7/2014 | Hagano | B60K 15/0406 141/302 |
| 2008/0184972 A1 * | 8/2008 | Ehrman | B60K 15/03504 123/518 |
| 2009/0056829 A1 | 3/2009 | Aitken et al. | |

(Continued)

*Primary Examiner* — J. Gregory Pickett
*Assistant Examiner* — Niki M Eloshway
(74) *Attorney, Agent, or Firm* — Geoffrey Brumbaugh; McCoy Russell LLP

(57) ABSTRACT

A capless refueling port attached to a fuel tank of a vehicle is presented. In one example, the capless refueling port includes a main opening, an articulating unitary plug mounted within a nozzle chamber of the fuel port, and a drain tube. The articulating plug is configured to partially or fully close an inlet of the drain tube connected to the fuel port during refueling; the articulating plug is further adjusted to open after refueling, allowing the fuel port to dissipate any residual pressure in the nozzle chamber to the atmosphere.

18 Claims, 6 Drawing Sheets

(56) References Cited

U.S. PATENT DOCUMENTS

| | | | |
|---|---|---|---|
| 2010/0224284 A1* | 9/2010 | Kolberg | F01N 3/2066 |
| | | | 141/325 |
| 2010/0313969 A1* | 12/2010 | Stokes | B60K 15/04 |
| | | | 137/312 |
| 2013/0206757 A1* | 8/2013 | Nagai | B60K 15/0406 |
| | | | 220/86.2 |
| 2014/0061192 A1 | 3/2014 | Aitken et al. | |
| 2016/0176286 A1* | 6/2016 | Lienenkamp | B60K 15/0406 |
| | | | 220/86.2 |
| 2016/0325619 A1* | 11/2016 | Le Mat | B01D 45/06 |

* cited by examiner

VEHICLE CAPLESS REFUELING SYSTEM

FIELD

The present description relates generally to systems of a vehicle capless refueling port. Specifically, a capless fueling port configured to reduce pressure build up in an underground fuel storage tank while minimizing fuel vapor emissions and fuel degradation.

BACKGROUND AND SUMMARY

Fuel systems for engines, e.g., diesel or gasoline engines, may include capless fuel port on a fuel filler pipe coupled to a fuel tank for replenishing fuel in the tank. Such a capless fueling port may include a fuel valve or sealing door which remains closed to seal off fuel system and reduce fuel vapor emissions from the fuel tank to the external atmosphere. The fuel valve or sealing door on the capless fuel port may be opened by inserting a fuel nozzle into the fuel port during refueling. Furthermore, the capless fueling port may be designed to collect and drain residual fuel and contaminants left in the fuel port after the fuel nozzle is removed at the end of refueling.

An example capless fueling port is presented by Gabbey et al in U.S. Pat. No. 6,994,130. Therein, a capless fueling system with a funnel port to receive a fueling nozzle is disclosed. The system has a spring loaded valve that is movable between an open position when the funnel port is open, and a closed position when the fuel valve overlies and seals the funnel port. Further, the system has a motor actuated shield that is adjustable to allow insertion of the fueling nozzle during refueling. The shield may be further adjusted to close the spring loaded valve upon completing refueling. Alternatively, an adjustable latch system which opens the spring loaded valve when a fueling nozzle is inserted in the funnel port during refueling may be employed. The latch system may be further adjusted to allow the valve to close after refueling.

Another example capless fueling system is presented by Aitken in U.S. Pat. No. 7,926,522. Therein, the capless fuel system includes a fuel filler device with a nozzle actuated valve mounted in a combination fuel and nozzle passage extending through the fuel filler pipe. A drain inlet located within the combination passage captures any fuel contaminants collected during refueling. The contaminants are collected and conducted through a drain pipe connecting the drain inlet and to the vehicle exterior. The drain pipe also provides an outlet for dissipating any vacuum pressure that may buildup in the fuel filler pipe and fuel tank during refueling.

However, the inventors have recognized potential issues with such capless refueling systems. For example, absence of a drain tube to drain any contaminants that may build up in a fuel port during refueling may degrade fuel quality. Further, buildup of any partial vacuum within the fuel filler pipe and fuel tank during refueling may pose additional issues if the vacuum pressure is not adequately dissipated. On the other hand, air leakage may occur during refueling of a capless fuel port with a drain tube connecting the fuel port to the atmosphere. The air sucked into the fuel port may lead to over pressurization of an underground fuel storage tank, and may lead to service disruptions in a fueling station. Increased frequency of service disruptions at a fueling station may lead to increased downtime and higher operating costs.

The inventors herein have developed a capless fueling port to address some of issues noted above. In one example, a capless vehicle refueling port may comprise: a drain tube at a bottom of the capless port; an articulating unitary plug that flexes due to nozzle insertion to rest upon and at least partially seal the drain tube, the plug captured between an external ramped opening element and a filler pipe contiguously mounted to the external opening.

In this way, one design of a capless refueling port may be used to reduce pressure buildup in an underground fuel storage tank while allowing residual fuel vapor to be collected from the fuel port to reduce fuel emissions. For example, an articulating plug mounted in a nozzle chamber of the capless refueling port may be pressed down by a fuel nozzle during refueling to partially close an inlet of a drain tube connected to the fuel port; in the partially closed position, the articulating plug reduces air leakage from the atmosphere to an underground storage tank fluidly connected to the fuel port. The articulating plug may be further shaped and positioned to open the drain tube inlet upon removal of the fuel nozzle from the fuel port after refueling. In this way, the capless refueling port may confer several advantages. By partially closing the drain tube inlet with the articulating plug during refueling, the capless refueling port may reduce over pressurization of the underground fuel storage tank. Further, removal of the fuel nozzle after refueling allows the articulating plug to rise up and open drain tube, allowing any residual pressure (that may buildup in the fuel port during refueling) to dissipate to the atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-7 are shown to scale, although other relative dimensions may be used, if desired.

DETAILED DESCRIPTION

Figure 1A:
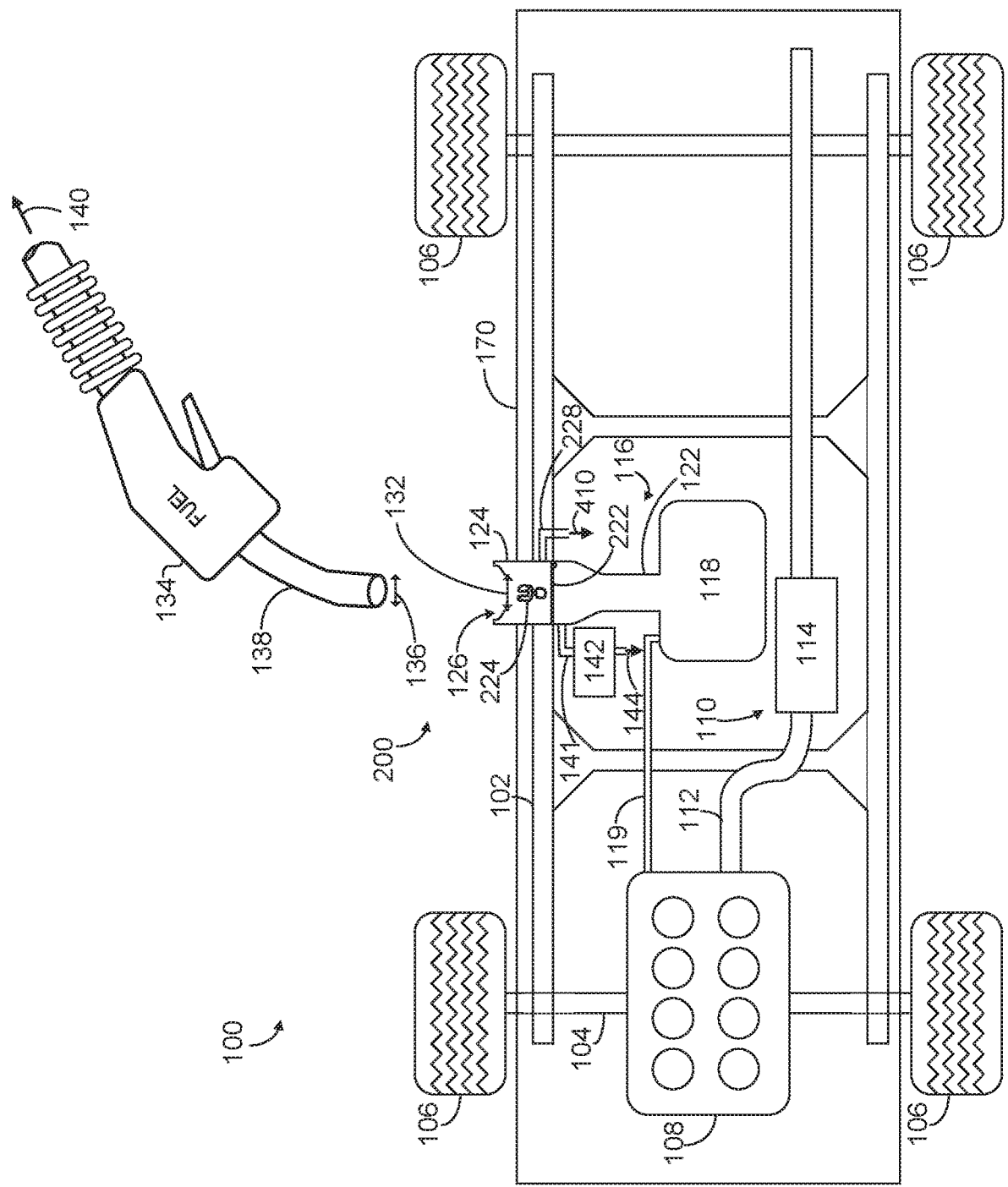
FIG. 1A shows a schematic depiction of an example vehicle system with a capless fueling port.
Figure 2:
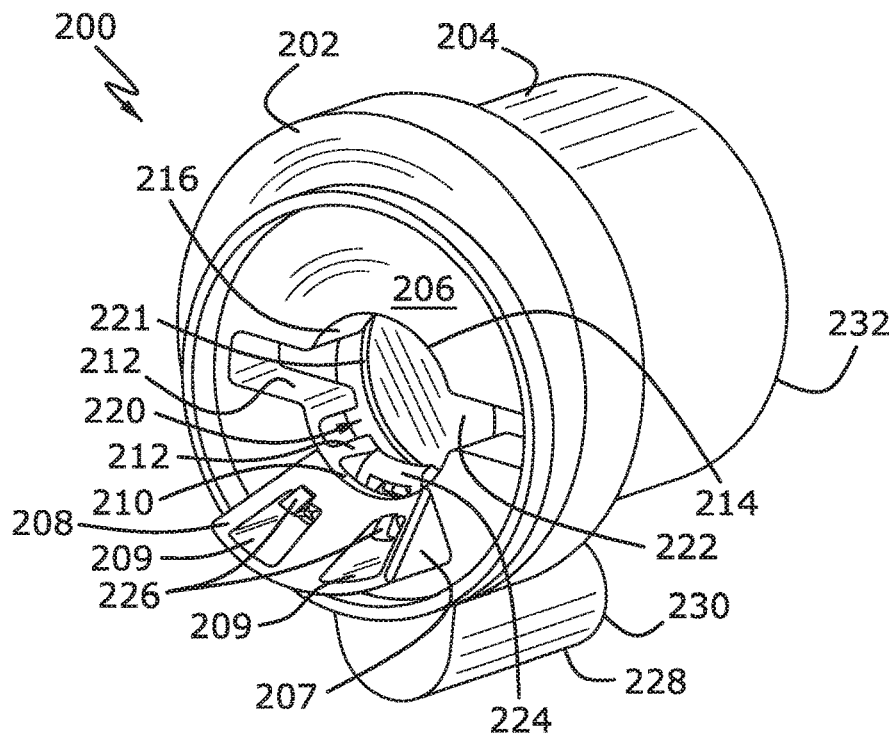
FIG. 2 shows the capless refueling port with a drain tube to drain residual fuel and minimize pressure buildup in an underground fuel storage tank.
Figure 3:
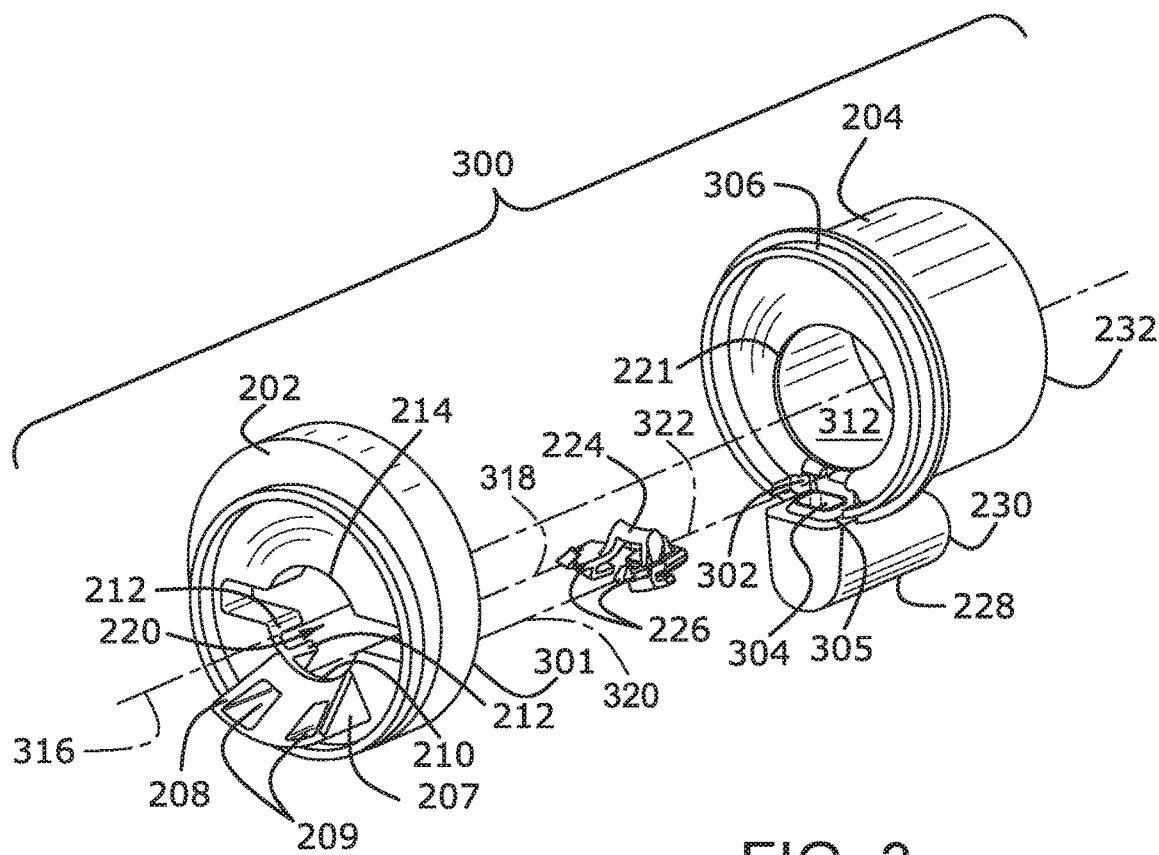
FIG. 3 shows an exploded view of the capless refueling port with a front housing, an articulating plug, a rear housing and a drain tube attached at a bottom portion of the front and rear housing.
Figures 4, 5:
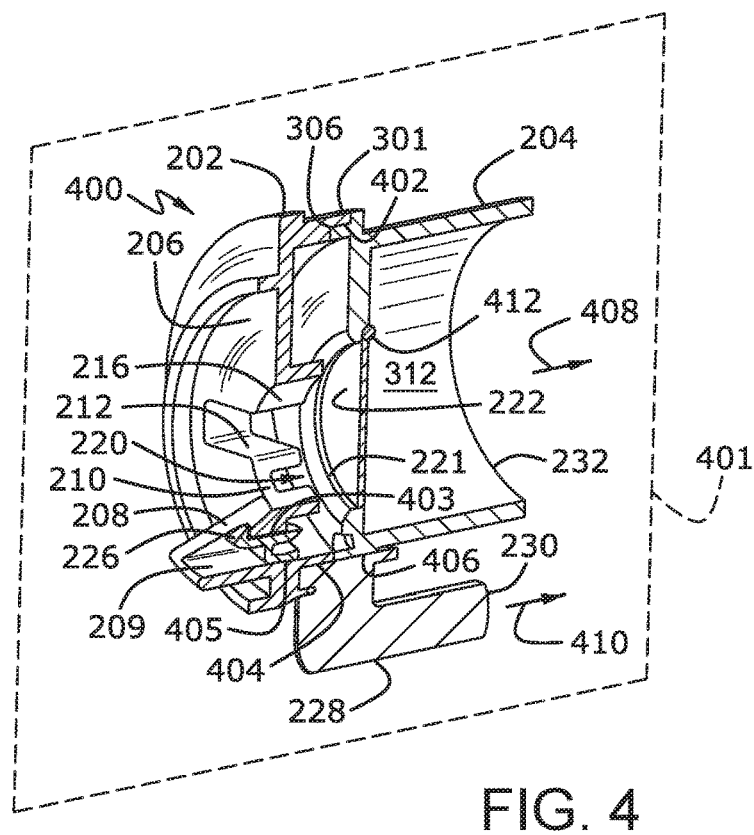
FIG. 4 shows a cross sectional view of the capless fueling port.
FIG. 5 shows a cross sectional view of the capless fueling port depicting position of the articulating plug with respect to the drain tube inlet.
Figure 6A:
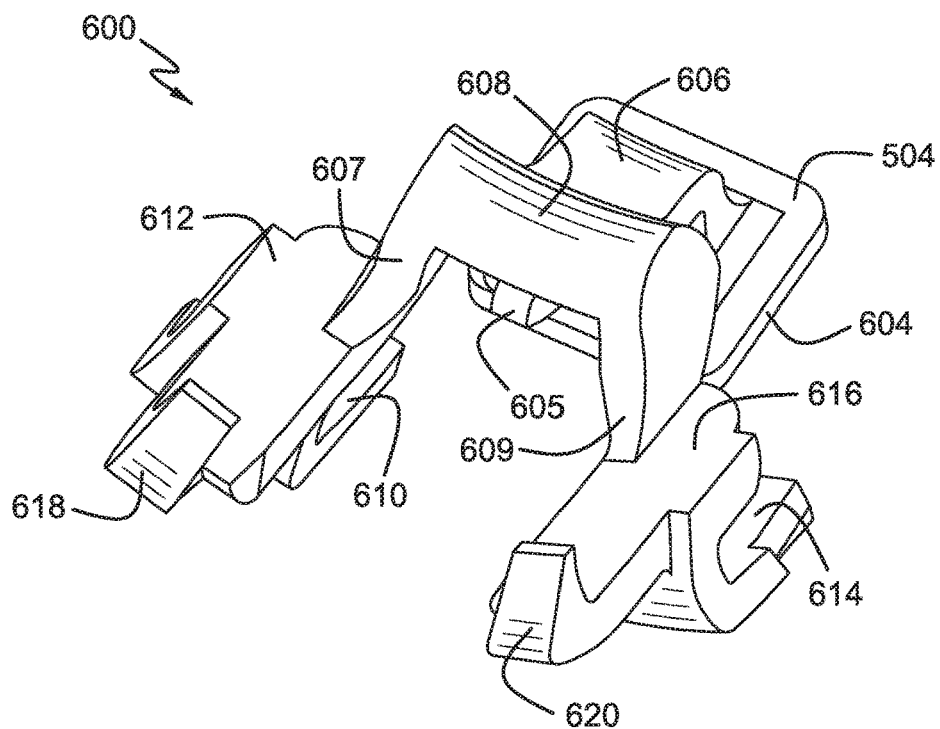
FIG. 6A shows a front view of the articulating plug of the capless fueling port.
Figure 6B:
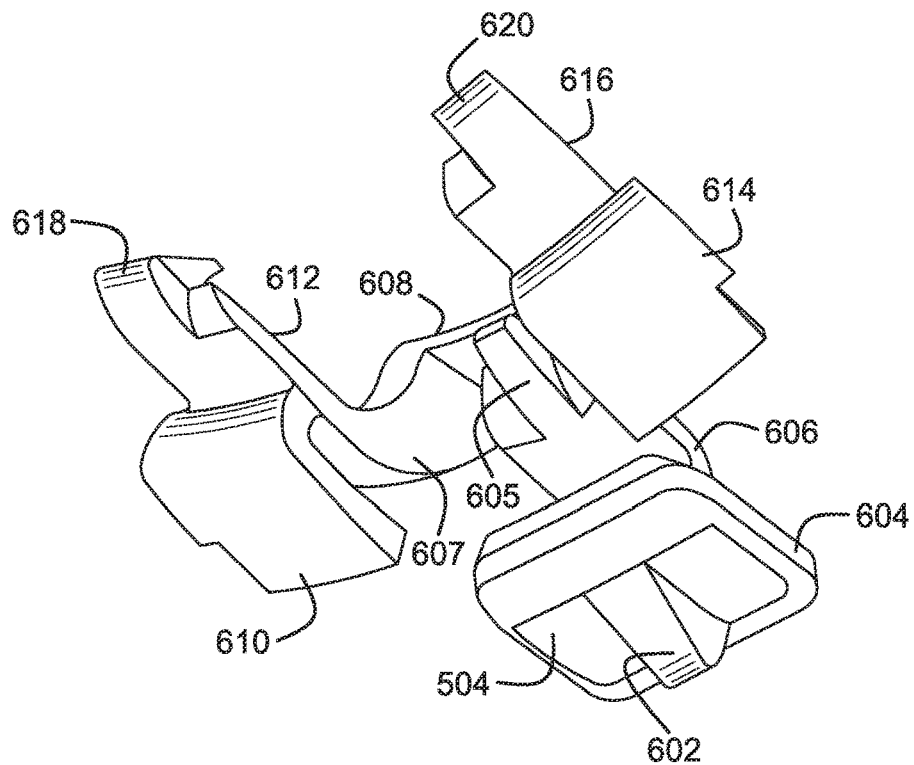
FIG. 6B shows an alternative view of the articulating plug of the capless fueling port.
Figure 6C:
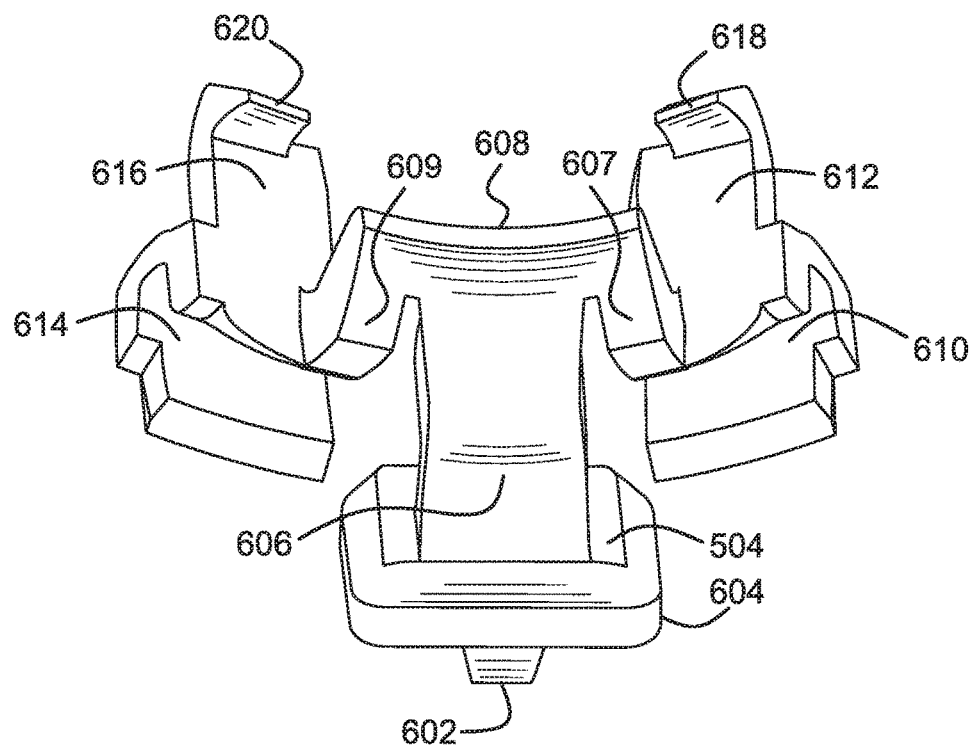
FIG. 6C shows a rear view of the articulating plug of the capless fueling port.
Figure 7:
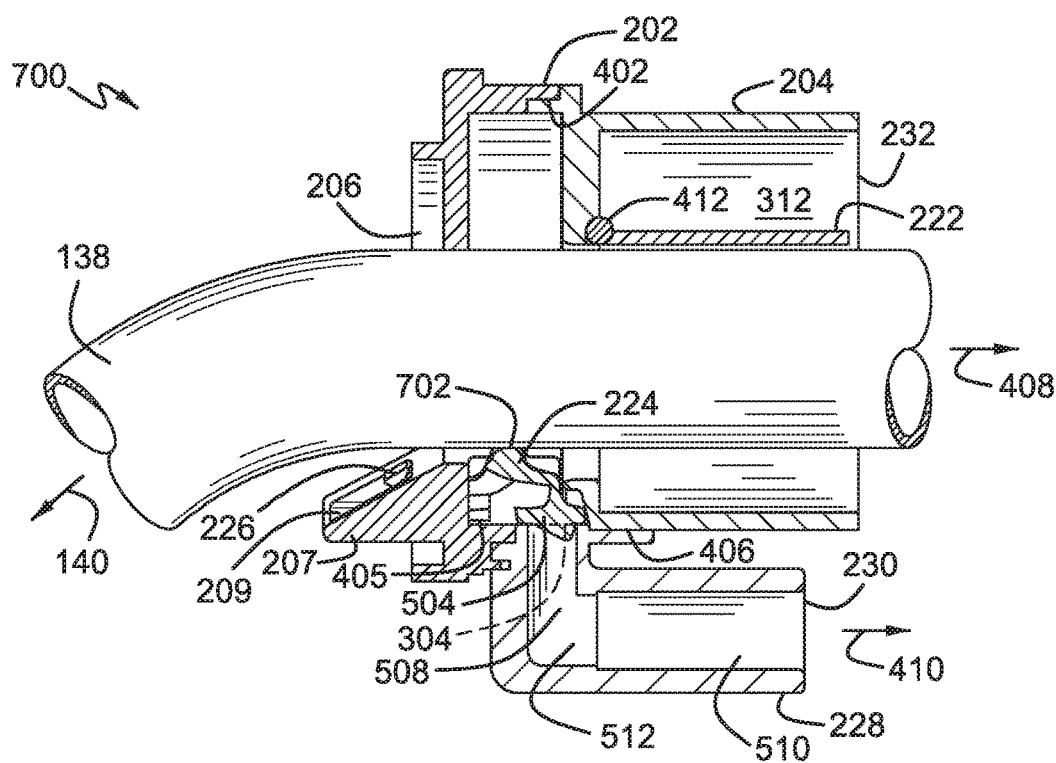
FIG. 7 shows a fuel nozzle disposed in the capless fueling port during refueling.

The following description relates to a capless refueling port of a vehicle, such as the vehicle shown at FIG. 1A. Details of a fueling system showing position of a drain tube and recirculation line attached to the fuel port are disclosed at FIG. 1B. For example, a capless refueling port may be included in a vehicle fueled with diesel, petrol or a suitable fuel blend such as a gasoline-ethanol fuel blend, etc. As shown at FIG. 2, the capless fuel port may be configured with a fuel nozzle opening, an articulating plug and a drain tube. The articulating plug may be adjusted to partially close a drain tube inlet of a drain tube that leads (directly or indirectly) to atmosphere in order to minimize air leakage from the atmosphere to an underground fuel storage tank during refueling. An exploded view of the capless refueling port depicting various components of the fuel port is shown at FIG. 3. The refueling port comprises a external ramped opening element adapted to fit over a filler pipe, a drain tube connected to the fuel port, and an articulating plug (mounted in a nozzle passage of the fuel port) to partially close a drain tube inlet. A cross sectional view of the capless refueling port with a front housing attached to a rear housing, and a section of an articulating plug mounted within a nozzle passage and attached to a lower ramp of the front housing is depicted at FIG. 4. A detailed view of the capless refueling port showing the articulating plug disposed within a main opening, and drain tube connected to the fuel port is depicted at FIG. 5. Features of the articulating plug are depicted at FIGS. 6A-6C. FIG. 7 shows a fuel nozzle disposed within a nozzle chamber of a fuel port during refueling. The insertion of the fuel nozzle into the fuel port moves a fuel valve to its open position and depresses an articulating plug to a partially or fully closed position.

FIGS. 1A-7 show example configurations with relative positioning of the various components of a capless refueling port for a vehicle. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 1A, a schematic depiction of an example vehicle system 100 is shown. Vehicle 100 may include a chassis 102, an axle 104 with wheels 106, and an engine 108, where the wheels may rest on the ground. The engine 108 may be a diesel engine in one example or a petrol or gasoline engine in other examples. The vehicle may include body sheet material, such as sheet metal, as shown herein. Further, although not shown, vehicle 100 may further include a transmission, cab, or other components.

Vehicle 100 may further include an exhaust system 110. The exhaust system may include an exhaust conduit 112 leading to one or more exhaust treatment devices, such as catalytic converter 114. Portions of the exhaust system, such as conduit 112, may be coupled to an exhaust manifold of the engine to flow exhaust gas from the exhaust manifold to the catalytic converter via conduit 112. Vehicle 100 may further include a fuel system 116 with one or more fuel storage tanks 118 for storing fuel on-board the vehicle. For example, fuel tank 118 may store one or more liquid fuels, including gasoline, diesel, alcohol fuel blends etc. Fuel tank 118 may be coupled to engine 108 via a fuel delivery line 119 to deliver fuel to the engine.

A fuel filler passage 122 may be coupled to fuel tank 118 to direct fuel into the fuel tank during refueling. A capless fueling port 200 may be coupled to fuel filler passage 122. As described in more detail below, a capless fueling port may include a nozzle chamber 124 with a nozzle stop 126 and a fuel valve 128. The nozzle chamber 124 may at least partially penetrate an outer surface 170 of vehicle 100 so that fuel may be replenished into the fuel tank via an external fuel source at a location shown by arrow 140. For example, fuel may be replenished in fuel tank 118 via fuel nozzle 138 at a refueling pump station. The nozzle stop 126 may be sized to prevent incorrectly-sized fuel nozzles or spouts from opening fuel valve 222 in the capless fuel port in order to reduce occurrences of mis-fueling. For example, in a diesel engine, a nozzle stop may be configured to permit a standard-sized diesel fuel nozzle to open the capless fuel port and prevent a petrol fuel nozzle, which may be smaller than a diesel fuel nozzle, from opening the fuel port. As another example, in a petrol engine, a nozzle stop may be configured to permit a standard-sized petrol fuel nozzle to open the capless fuel port and prevent a diesel fuel nozzle from opening the fuel port. Further, the fuel valve 222 held in place by one or more latches may remain closed to seal off the fuel tank, and may be opened by inserting a fuel nozzle, such as nozzle 138 of fuel dispensing device 134, into the nozzle chamber 124.

For example, a diameter 132 of nozzle stop 126 may be sized to receive a fuel nozzle associated with a specific type of fuel, e.g., diesel or petrol, used by engine 108. Thus, when a fuel nozzle of equal diameter as a nozzle stop diameter is inserted into the capless refueling port, the nozzle stop may allow the fuel nozzle to actuate the fuel valve to open and dispense fuel into the fuel tank. In this case, fuel nozzle diameter 136 may be equal to nozzle stop diameter 132. However, when the fuel nozzle diameter is different from the nozzle stop diameter, the fuel valve may remain closed thus preventing mis-fueling. In one example, a fuel nozzle diameter may be larger than a nozzle stop diameter. In this case, a nozzle stop may remain closed, preventing the fueling nozzle from actuating the fuel valve and dispensing fuel.

An articulating unitary plug 224 may be mounted within the nozzle chamber of the capless refueling port to control opening and closing of an inlet of drain tube 228 fluidly coupled to the fuel port, an example of which is being further illustrated at FIGS. 2-5. The drain tube outlet is open directly to atmosphere. When refueling, the fuel nozzle may press down the articulating plug to partially or fully close the drain tube inlet and block communication to atmosphere to reduce air leakage into the capless refueling port from the atmosphere via the drain tube. By reducing air suction into the fuel port from outside, the articulating plug reduces pressure buildup in an underground fuel storage tank during refueling. After refueling the fuel nozzle may be removed from the nozzle chamber, allowing the articulating plug to rise or flex up and open the drain tube inlet, allowing the fuel port to dissipate any pressure (that may buildup within the nozzle chamber during refueling) to the atmosphere as shown by arrow 410. A recirculation line 141 allows fuel vapor from the nozzle chamber to be conducted to a fuel canister 142 where the vapor may be stored and before being purged to the fuel system and/or engine intake during engine operation as shown by arrow 144, for example. The circulation line is separate from and distinct from the drain tube. In particular, the recirculation line communicates directly with the vapor canister and regulates the flow of vapor in the system to help pull vapor into the canister. The drain tube (coupled with the articulating plug) is open to atmosphere thus can, if not closed, allow air ingestion with what may be referred to as vapor recovery nozzles (particularly the vacuum assist versions that pull an artificial vacuum on the system by a station vacuum pump).

Figure 1B:
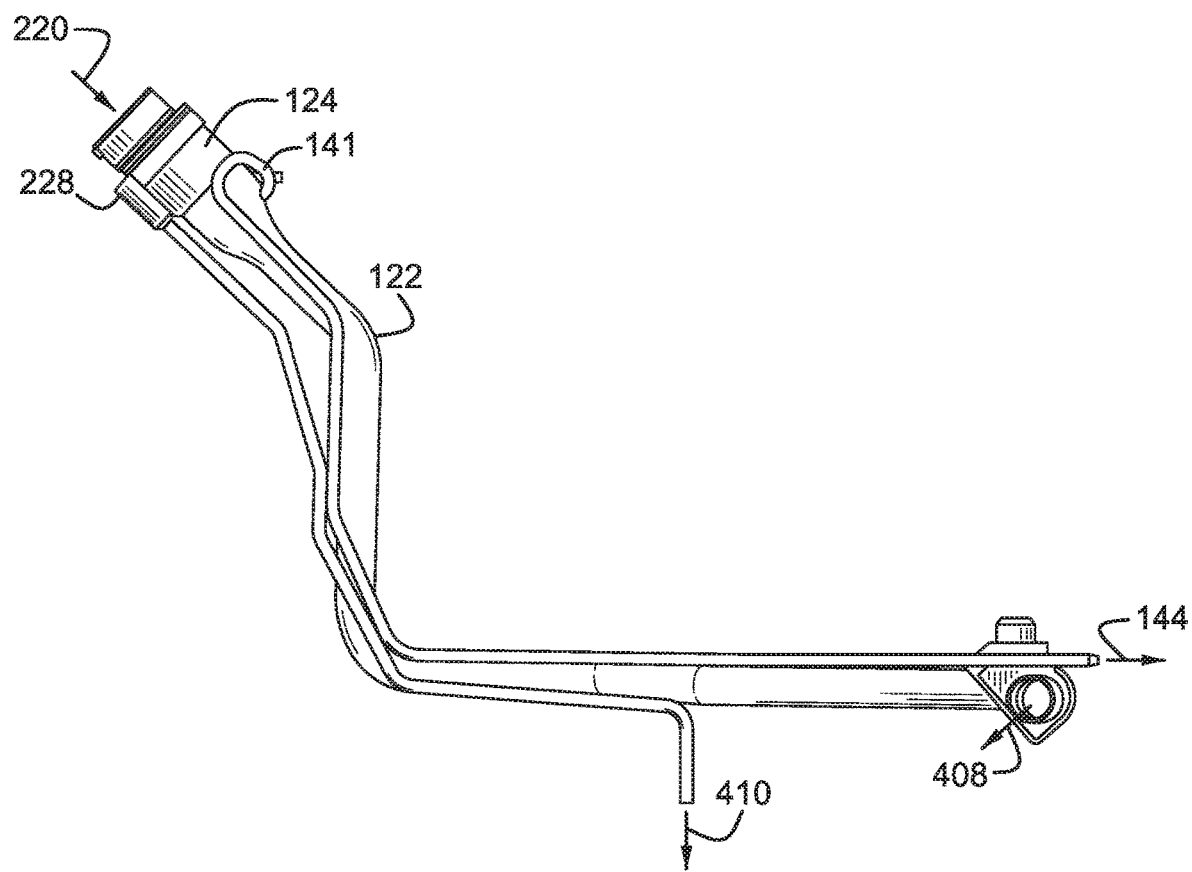
FIG. 1B shows a schematic depicting position of a drain tube and recirculation line attached to the capless fueling port.

Details of the fuel port showing position of the drain tube and recirculation line are disclosed further at FIG. 1B. As shown, the capless fueling port has a main opening 220 at a front end of the fuel port, and nozzle chamber 124 connected to fuel passage 122 leading to the fuel tank as shown by arrow 408. Further, drain tube 228 may be attached to a bottom end of the fuel port, and connected to the ground or atmosphere via a distal end of the drain tube as shown by arrow 410. A recirculation line 141, attached to a top portion of the fuel port, has an inlet disposed within the nozzle chamber at a location behind the sealing door. The recirculation line communicates directly with the vapor canister and allows the fuel vapor to be purged from the nozzle chamber to the fuel system and/or engine intake via the canister as shown by arrow 144. In this way, the capless refueling port minimizes over pressurization of the underground fuel storage tank caused by air leakage from the atmosphere while reducing fuel vapor emissions.

In this way, the system of FIG. 1A provides for a vehicle system, comprising: external body sheet material of the vehicle system, and a capless vehicle refueling port mounted into an opening of the body sheet material and having a drain tube at a bottom of the capless port and an articulating unitary plug that flexes due to nozzle insertion to rest upon and at least partially seal the drain tube, the plug captured between an external ramped opening element and a filler pipe contiguously mounted to the external opening, the drain tube leading vertically down with respect to gravity when the vehicle system is positioned with wheels of the vehicle on level ground.

Turning to FIG. 2, a capless refueling port 200 is depicted with an external ramped opening element, a fuel filler pipe, an adjustable articulating unitary plug, and a drain tube attached to the fuel port. The capless refueling port may be provided on a fueling system of a vehicle, such as shown in FIG. 1, and may be adapted for use with gasoline, diesel or other fuel blends dispensed from a fuel dispensing system.

The capless refueling port 200 includes an external ramped opening element 202 attached to a filler pipe 204 contiguously mounted to an external opening 220. The filler pipe 204 may be latched via distal end 232 to a fuel passage connected to an onboard vehicle fuel tank (such as fuel passage 122 connected to fuel tank 118 at FIG. 1A). The distal end 232 of the filler pipe is fluidly connected to the fuel passage of the fuel tank. The external opening 220 defined in a front circular face 206 is adapted and sized to receive a fuel nozzle of a fuel dispensing system (such as fuel nozzle 138 of fuel dispensing system 134 at FIG. 1A). A circular rib 221 separates external opening 220 from an internal contiguous opening disposed behind fuel valve 222 in an inner region of the filler pipe 204 as shown in detail at FIGS. 3-5. The fuel valve 222 may be mounted behind circular rib 221 and attached to an upper region inside the filler pipe via a latch or hinge mechanism as shown in detail at FIGS. 4-5. When closed, the fuel valve seals off the fuel tank to reduce fuel vapor emissions to the atmosphere via external opening 220. The fuel valve may be opened upon insertion of the fuel nozzle into the fuel port during refueling. The external opening 220 and the internal opening behind the fuel valve comprise a nozzle chamber of the capless refueling port (such as nozzle chamber 124 at FIG. 1A). The external opening 220 is defined by a lower circular arc 210 and an upper circular arc 214 adapted to hold the fuel nozzle during refueling. A plurality of ribs 212 attached to the lower circular arc, and ribs 216 attached to the upper circular arc provide rigidity to the external ramped opening element. For example, the external opening may include circular-shaped edge walls forming the opening only partially around, with remaining walls of the opening formed by flat rectangular walls above a ramp of the external ramped opening element.

A lower ramp 207 attached to the lower end of the external ramped opening element has a plurality of lower rib elements 208. The lower rib elements define opening 209 between each pair of lower ribs. For example, openings located within ribs forming the lower ramp are smaller compared to a main opening for the fuel nozzle in the external ramped opening element. An articulating plug 224 is mounted within external opening 220 and securely attached to the lower ramp 207 via snap-fit extensions 226 which extend through opening 209. In one example, the snap fit extensions of the articulating plug may be linear fit extensions configured to snap to an upper edge of the lower ramp. In another example, the articulating plug may include a first and second snap-fit extension that mate and snap into retention with corresponding openings in the external ramped opening element. In yet another example, a first and second snap-fit extensions may extend longitudinally parallel to a central axis of the capless fuel port.

During refueling, the articulating plug may be pressed down by the fuel nozzle (not shown) to partially close an inlet of drain tube 228 attached to the fuel port. Details of the drain tube inlet and mode of connection of the drain tube to the fuel port are shown at FIG. 3. For example, a fuel nozzle may be inserted through the nozzle chamber of the capless refueling port to press down the articulating plug to partially close the drain tube inlet to reduce air leakage from outside the fuel port via the drain tube during refueling. Further, the fuel nozzle may be removed from the nozzle chamber after refueling to allow the articulating plug to rise up and partially open the drain tube inlet, connected to the atmosphere via distal end 230 of the drain tube. A recirculation line (not shown) may be attached to the fuel port to collect residual fuel vapor from the nozzle chamber to a fuel canister where the vapor is treated and recirculated back to the fuel tank. By controlling the opening and closing of the drain tube inlet, the articulating plug of the capless refueling port minimizes pressure buildup in an underground fuel storage tank caused by air leakage from the atmosphere via the drain tube during refueling. The capless refueling port also provides a means of collecting residual fuel vapor from the fuel port to the fuel canister while minimizing fuel vapor emissions to the atmosphere.

In this way, the system of FIG. 2 provides for a system, comprising: a capless vehicle refueling port including a drain tube at a bottom of the capless port opening up into an interior of the refueling port inside the port with respect to a flap of the capless vehicle refueling port and positioned opposite a ramp on an exterior side of a nozzle opening from the drain tube, and a unitary plug that flexes, without interacting with any other springs, only at one end due to engagement with a bottom exterior surface of a tube of a refueling nozzle to rest upon and at least partially seal the drain tube, the plug captured and held in place only at a second end opposite to the one end, the plug having first and second snap-fit extensions flanking a central axis of the port and positioned below the central axis.

Referring now to FIG. 3, an exploded view shows a capless refueling port 300 with an external ramped opening element, an articulating plug, a filler pipe and a drain tube attached to the fuel port. Details of mounting the articulating plug within the external ramped opening element 202 and filler pipe 204 are disclosed. The external ramped opening element 202 may be secured to filler pipe 204 by snapping distal end 301 over annular edge 306 of the filler pipe 204. When assembled, the external ramped opening element is attached to the filler pipe such that external opening 220 aligns with inner opening 312 along an axis 316 of the fuel port. The distal end 232 of the filler pipe may be attached to a fuel passage connecting to an onboard fuel tank of a vehicle (such as fuel passage 122 of fuel tank 118 at FIG. 1A). A drain tube 228 may be attached to the filler pipe by snapping grooved ends of a bottom portion of the annular edge 306 to a rear portion of chamfered edge 305 defining an exterior region around drain inlet 304. Similarly, the drain tube 228 may be attached to the external ramped opening element by sliding a lower portion of distal end 301 over front portion of chamfered edge 305. In one example, the drain tube extends vertically downward at all points from the drain tube inlet to a first 90 degree bend. The external ramped opening element, filler pipe and drain tube may be manufactured from a plastic composite or any other suitable material such as polyphthalamide, stainless steel, acetal, etc.

An articulating plug 224 may be mounted within external opening 220, and securely attached to lower ramp 207 of the external ramped opening element by inserting snap-fit extensions 226 through opening 209 defined between a pair of lower ribs 208. For example, a first snap-fit extension may be moved along axis 318 and inserted into a first opening, and a second snap-fit extension may be moved along axis 320 and inserted into a second opening. In another, example, a base of the articulating plug may be moved along axis 322 and placed over drain tube inlet 304. In yet another example, the first and second snap-fit extension may be inserted through the first and second opening in the lower ramp, with upper hooks of the snap-fit extensions securely attached to an upper edge of the lower ramp. Details of attaching the articulating plug to the lower ramp are further disclosed at FIGS. 4-5. The articulating plug may be adjustable such that its base covers slot 304 of the drain tube 228, with the edges of the plug base abutting and sealing against planar surface 302 of a bottom of front portion 306 of filler pipe 204. The details showing the articulating plug mounted within opening 220 of the external ramped opening element are disclosed in FIGS. 4-5. In this way, the external ramped opening element may be attached to the filler pipe and the drain tube, with the articulating plug mounted within a main opening of the capless refueling system. By mounting the articulating plug over the drain tube inlet, opening and closing of the drain tube may be adjusted to control pressure variations within the fueling system during refueling.

Referring now to FIG. 4, a cross section view 400 is shown along plane 401 of a capless refueling port. The cross sectional view shows details of an external ramped opening element 202 attached to filler pipe 204. Also, details of attaching a snap-fit extension of an articulating plug to the external ramped opening element are disclosed.

A distal end 301 of the external ramped opening element 202 may be securely latched onto annular edge 306 of filler pipe 204 along contact interface 402 which delimits a circumferential region of contact between the external ramped opening element and filler pipe. Fuel valve 222 located along circular edge 221 defines a boundary between external opening 220 and internal opening 312. The fuel valve may be attached to an upper end of circular edge 221 by hinge 412. When closed, the fuel valve seals off a fuel tank from the external opening, to reduce or minimize fuel vapor emissions to the atmosphere. During refueling, the fuel valve may be opened upon insertion of a fuel nozzle into the fuel port. When the fuel valve is open, external opening 220 and internal opening 312 comprise a nozzle chamber (such as nozzle chamber 124 at FIG. 1) of the fuel port. The nozzle chamber is fluidly connected to a fuel passage attached to the fuel tank (such as fuel passage 122 of fuel tank 118 at FIG. 1A) in a direction of arrow 408. The fuel valve may be closed after refueling and upon removing the fuel nozzle from the fuel port to reduce or minimize fuel vapor emissions.

The snap-fit extension 226 of an articulating plug is inserted through opening 209 in lower ramp 207 such that an upper portion 403 and a lower portion 405 of the plug abut and seal against upper and lower planar surfaces of opening 209, respectively. For example, a first snap-fit extension of the articulating plug may be inserted through a first opening in the lower ramp, an upper portion of the snap-fit extension in face contact with an upper region of the opening, and a lower portion of the snap-fit extension in face contact with a lower region of the opening.

A top portion of drain tube 228 is securely attached to a bottom end of the external ramped opening element 202 and filler pipe 204 along contact interfaces 404 and 406, respectively. For example, the drain tube may be attached to the capless refueling port by sliding a lower portion of the external ramped opening element over a chamfered edge defining a front exterior region around a drain tube inlet. Similarly, a lower portion of the filler pipe may be attached over a rear exterior region around the drain tube inlet. Distal end 230 of the drain tube may be connected to the atmosphere as shown by arrow 410, allowing the fuel port to dissipate any pressure that may buildup within the nozzle chamber during refueling. In another example, the drain tube may be attached to the fuel port by latching grooved ends of a lower portion of the external ramped opening element and filler pipe over the chamfered edge around drain tube inlet. In this way, the external ramped opening element attached to the filler pipe and the drain tube, with the articulating plug mounted within an interior passage of the fuel port. By mounting the articulating plug over the drain tube inlet, pressure variations within the fuel port may be controlled by adjusting the plug to partially open and close the inlet during refueling.

Referring now to FIG. 5, a cross section view 500 along plane 501 of a capless refueling port is shown. A distal end of external ramped opening element 202 slides over frontal portion of filler pipe 204 forming at tight coupling along contact interface 402 which defines a circumferential area of contact between the external ramped opening element and filler pipe. Lower ends of the external ramped opening element and filler pipe are configured to fit over chamfered edges of a drain inlet 304 (as disclosed in FIG. 3), with a portion of the filler pipe contacting planar surface of drain tube 228 along contact interface 406. The capless refueling port may be attached to a vehicle as depicted by an upper portion 514 and a lower portion 516 of the vehicle body. The upper and lower portion of the vehicle body may comprise sheet metal material or a suitable material such as a carbon fiber composite, etc. Fuel valve 222 located along circular edge 221 separates external opening 220 from internal opening 312. The fuel valve may be attached to an upper end of circular edge 221 by hinge 412. The fuel valve seals off a fuel tank from the external opening, to reduce or minimize fuel vapor emissions to the atmosphere. During refueling, the fuel valve may be opened upon insertion of a fuel nozzle into the fuel port. When the fuel valve is open, the external opening and internal opening define a nozzle chamber (such as nozzle chamber 124 at FIG. 1A) of the fuel port. The fuel valve may be closed after refueling and upon removing the fuel nozzle from the fuel port to reduce fuel vapor emissions.

An articulating plug 224 shown in a mounted position, has a snap-fit extension 226 securely attached to an upper and a lower planar surface of opening 209. The base 504 of the articulating plug is disposed over an inlet 304 of drain tube 228 such that edges of the plug abut and seal against abutment surfaces 502 and 504 of a bottom portion of the filler pipe. For example, the base of the articulating plug may partially or fully close the drain tube inlet during refueling to minimize or reduce air leakage from outside the fuel port to an underground fuel storage tank via the drain tube. In this way, the capless refueling port minimizes pressure build up within the underground fuel storage tank during refueling.

The drain tube is configured with a smaller diameter pipe 508 near the drain inlet 304. Further, the drain tube has a junction 512 where the small diameter pipe transitions to a larger diameter pipe 510. Distal end 230 of the drain tube may be connected to the atmosphere as shown by arrow 410, allowing the fuel port to dissipate any pressure that may buildup within the nozzle chamber during refueling. A recirculation line (not shown) may be attached to the fuel port to collect residual fuel vapor from the nozzle chamber to a fuel treatment device. In this way, the capless refueling port collects and conducts away any residual fuel vapor to reduce fuel emissions.

Referring now to FIGS. 6A-6C, an articulating plug is shown for sealing an inlet of a drain tube of a capless refueling port. The articulating plug has a cross member 608 which connects a first arm 607 and second arm 609. The first arm 607 has an upper limb 612 with a snap-fit end 618, and a downward extending flat L-shaped bent tab 610. Similarly, the second arm 609 has an upper limb 616 with a snap-fit end 620, and a downward extending flat L-shaped bent tab 614. For example, when the articulating plug is mounted within the nozzle passage as shown in FIGS. 2-5, the upper limbs 612 and 616 abut and seal against an upper planar surface of opening 209 with snap-fit ends 618 and 620 securely attached to an edge of a lower ramp 207, while the downward extending flat L-shaped bent tabs 610 and 614 abut and seal against a lower planar surface of opening 209. In another example, a first and second snap-fit extensions may comprise a downward extending flat L-shaped bent tab, the tab engaging directly with a bottom of the corresponding openings in the external ramped opening element to urge the first and second snap-fit extensions upward and retain the first and second snap-fit extensions.

A downward projecting central ramp 605 allows the articulating plug to be securely attached to an inner edge of a lower ramp of an external ramped opening element as illustrated in FIG. 5. The cross member 608 connects to a rectangular base 504 via a reinforcing rib 606 centrally located on the plug. For example, a central vertical projection of the articulating plug may be further integrally coupled to the rectangular plug cover via only a single arm with a reinforcing rib centrally located on the plug, the rectangular plug further having a downward projecting central ramp ramping downward in a direction of nozzle insertion. A downward projecting ramp element 602 located in the base 504 allows the articulating plug to seal against a drain tube inlet when the plug is mounted as illustrated in FIG. 5. Further, edges 622 of base 504 allow the articulating plug to abut and seal against planar edges of a lower portion of the external ramped opening element and filler pipe as depicted in FIG. 5. In this way, the articulating plug of the capless refueling port provides a means for closing a drain tube during refueling to minimize air leakage from outside to reduce pressure buildup in an underground fuel storage tank connected to the fuel port.

Referring now to FIG. 7, a fuel nozzle is shown inside a capless refueling port during refueling. Insertion of fuel nozzle 138 into the fuel port opens fuel valve 222 allowing the fuel nozzle to dispense fuel into a fuel tank via a fuel passage (such as passage 122 of fuel tank 118 at FIG. 1A) located in a direction of arrow 408. The fuel nozzle is held in the fuel port by edges of the external opening with a portion of a lower region of the fuel nozzle contacting a top portion of the articulating plug along contact interface 702.

During refueling, the fuel nozzle may press down on a top curved surface of the articulating plug 224 (mounted within the nozzle chamber and attached to lower ramp 207), such that rectangular base 504 of the plug partially or fully closes a drain tube inlet 304. A first and second snap-fit extensions attached to a central reinforcing element of the articulating plug may stretch further to firmly grip an upper edge of lower ramp 207 when the plug is pressed down by the fuel nozzle. For example, a first and second snap-fit extensions straddle sides of a central vertical projection that projects up into a passage formed by a main opening, the central vertical projection having a curved top surface, the central vertical projection having first and second arms extending to connect integrally with the first and second snap-fit extensions, respectively, the first and second arms deflected downward by insertion of the nozzle. By closing the drain tube during refueling, the articulating plug minimizes or reduces air leakage from outside the capless fuel port to reduce pressure buildup in an underground fuel storage tank connected to the fuel port.

Upon completion of the refueling operation and withdrawal of the fuel nozzle from the fuel port, fuel valve 222 may close and seal off the fuel tank to reduce fuel vapor emissions to the atmosphere. Further, the central reinforcing element of the articulating plug may flex up allowing the drain tube inlet to open, and dissipate any pressure (that may buildup in the fuel port during refueling) to the atmosphere via distal end 230. A recirculation line (not shown), may be connected to the fuel port to collect fuel vapor from the nozzle chamber to a fuel canister, where the vapor may be treated and recirculated back to the fuel tank. In this way, the capless refueling port allows for collection of fuel vapor from the fuel port to minimize fuel emissions.

In one example, a capless vehicle refueling port comprises: a drain tube at a bottom of the capless port; and an articulating unitary plug that flexes due to nozzle insertion to rest upon and at least partially seal the drain tube, the plug captured between an external ramped opening element and a filler pipe contiguously mounted to the external opening. In the preceding example additionally or optionally, the plug includes first and second snap-fit extension that mate and snap into retention with corresponding openings in the external ramped opening element. In any or all of the preceding examples, additionally or optionally, the corresponding openings are fully within ribs forming the ramp, the corresponding openings smaller than a main opening for the nozzle in the external ramped element. In any or all of the preceding examples, additionally or optionally, the first and second snap-fit extensions extend longitudinally parallel to a central axis of the port. In any or all of the preceding examples, additionally or optionally, the first and second snap-fit extensions straddle sides of a central vertical projection that projects up into a passage formed by the main opening, the central vertical projection having a curved top surface, the central vertical projection having first and second arms extending to connect integrally with the first and second snap-fit extensions, respectively, the first and second arms deflected downward by insertion of the nozzle.

Furthermore, in any or all of the preceding examples, additionally or optionally, the central vertical projection is further integrally coupled to a rectangular plug cover via only a single arm with a reinforcing rib centrally located on the plug, the rectangular plug further having a downward projecting central ramp ramping downward in a direction of nozzle insertion. In any or all of the preceding examples, additionally or optionally, each of the first and second snap-fit extensions further comprise a downward extending flat L-shaped bent tab, the tabs engaging directly with a bottom of the corresponding openings in the external ramped opening element to urge the first and second snap-fit extensions upward and retain the first and second snap-fit extensions. In any or all of the preceding examples, additionally or optionally, there is no additional spring coupling or interacting with the articulating plug. In any or all of the preceding examples, additionally or optionally, the main opening includes circular-shaped edge walls forming the opening only partially around, with remaining walls of the opening formed by flat rectangular walls above the ramp of the external ramped opening element. In any or all of the preceding examples, additionally or optionally, the drain tube extends vertically downward at all points from the opening sealed by the plug to a first 90 degree bend.

An example system comprises: a cap-less vehicle refueling port including a drain tube at a bottom of the cap-less port opening up into an interior of the refueling port inside the port with respect to a flap of the cap-less vehicle refueling port and positioned opposite a ramp on an exterior side of a nozzle opening from the drain tube, and a unitary plug that flexes, without interacting with any other springs, only at one end due to engagement with a bottom exterior surface of a tube of a refueling nozzle to rest upon and at least partially seal the drain tube, the plug captured and held in place only at a second end opposite to the one end, the plug having first and second snap-fit extensions flanking a central axis of the port and positioned below the central axis. In the preceding example additionally or optionally, first and second snap-fit extension mate and snap into retention with corresponding openings in the external ramped opening element. In any or all of the preceding examples, additionally or optionally, the corresponding openings are fully within ribs forming the ramp, the corresponding openings smaller than a main opening for the nozzle in the external ramped element.

Another example of a vehicle system comprises: external body sheet material of the vehicle system, and a cap-less vehicle refueling port mounted into an opening of the body sheet material and having a drain tube at a bottom of the cap-less port and an articulating unitary plug that flexes due to nozzle insertion to rest upon and at least partially seal the drain tube, the plug captured between an external ramped opening element and a filler pipe contiguously mounted to the external opening, the drain tube leading vertically down with respect to gravity when the vehicle system is positioned with wheels of the vehicle on level ground. In any or all of the preceding examples, additionally or optionally, the plug includes first and second snap-fit extension that mate and snap into retention with corresponding openings in the external ramped opening element. In any or all of the preceding examples, additionally or optionally, the corresponding openings are fully within ribs forming the ramp, the corresponding openings smaller than a main opening for the nozzle in the external ramped element.

In yet another example, the first and second snap-fit extensions extend longitudinally parallel to a central axis of the port, wherein the first and second snap-fit extensions straddle sides of a central vertical projection that projects up into a passage formed by the main opening, the central vertical projection having a curved top surface, the central vertical projection having first and second arms extending to connect integrally with the first and second snap-fit extensions, respectively, the first and second arms deflected downward by insertion of the nozzle, and wherein the central vertical projection is further integrally coupled to a rectangular plug cover via only a single arm with a reinforcing rib centrally located on the plug, the rectangular plug further having a downward projecting central ramp ramping downward in a direction of nozzle insertion. In any or all of the preceding examples, additionally or optionally, each of the first and second snap-fit extensions further comprise a downward extending flat L-shaped bent tab, the tabs engaging directly with a bottom of the corresponding openings in the external ramped opening element to urge the first and second snap-fit extensions upward and retain the first and second snap-fit extensions. In any or all of the preceding examples, additionally or optionally, there is no additional spring coupling or interacting with the articulating plug. In any or all of the preceding examples, additionally or optionally, the drain tube extends vertically downward at all points from the opening sealed by the plug to a first 90 degree bend.

Note that the example systems included herein can be used with various capless refueling system configurations. It will be appreciated that the configurations and routines disclosed herein are exemplary in nature, and that these specific embodiments are not to be considered in a limiting sense, because numerous variations are possible. For example, the above technology can be applied to a vehicle capless refueling system and other vehicle refueling systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A capless vehicle refueling port, comprising:
 a top portion of a drain tube attached to a bottom end of an external ramped opening element of the port;
 a nozzle chamber; and
 an articulating unitary plug mounted within the nozzle chamber, wherein the plug flexes due to nozzle insertion to rest upon and at least partially seal the drain tube, the plug captured between the external ramped opening element of the port and a filler pipe contiguously mounted to the external ramped opening element of the port;
 wherein the external ramped opening element of the port fits over the filler pipe.

2. The port of claim 1, wherein the plug includes first and second snap-fit extensions that mate and snap into retention with corresponding openings in the external ramped opening element of the port.

3. The port of claim 2, wherein the corresponding openings in the external ramped opening element of the port are fully within ribs forming a ramp, the corresponding openings smaller than a main opening for a nozzle in the external ramped opening element of the port.

4. The port of claim 3, wherein the first and second snap-fit extensions straddle sides of a central vertical projection that projects up into a passage formed by the main opening, the central vertical projection having a curved top surface, the central vertical projection having first and second arms extending to connect integrally with the first and second snap-fit extensions, respectively, and the first and second arms deflected downward by insertion of the nozzle.

5. The port of claim 4, wherein the central vertical projection is further integrally coupled to a rectangular plug cover via only a single arm with a reinforcing rib centrally located on the plug, the rectangular plug cover further having a downward projecting central ramp ramping downward in a direction of nozzle insertion.

6. The port of claim 5, wherein each of the first and second snap-fit extensions further comprises a downward extending flat L-shaped bent tab, the tabs engaging directly with a bottom of the corresponding openings in the external ramped opening element of the port to urge the first and second snap-fit extensions upward and retain the first and second snap-fit extensions.

7. The port of claim 2, wherein the first and second snap-fit extensions extend longitudinally parallel to a central axis of the port.

8. The port of claim 3, wherein the main opening includes circular-shaped edge walls forming the opening only partially around, with remaining walls of the main opening formed by flat rectangular walls above the ramp of the external ramped opening element of the port.

9. The port of claim 1, wherein there is no additional spring coupling or interacting with the plug.

10. The port of claim 1, wherein the drain tube extends vertically downward at all points from a drain tube inlet sealed by the plug to a first 90 degree bend.

11. A system, comprising: a capless vehicle refueling port including a drain tube at a bottom of the port opening up into an interior of the port inside the port with respect to a flap of the port and positioned opposite a ramp on an exterior side of a nozzle opening from the drain tube, and a unitary plug that flexes, without interacting with any other springs, only at one end due to engagement with a bottom exterior surface of a tube of a refueling nozzle to rest upon and at least partially seal the drain tube, the plug captured and held in place only at a second end opposite to the one end, the plug having first and second snap-fit extensions flanking a central axis of the port and positioned below the central axis;
 wherein the first and second snap-fit extensions mate and snap into retention with corresponding openings in an external ramped opening element; and
 wherein the corresponding openings in the external ramped opening element are fully within ribs forming the ramp, the corresponding openings smaller than a main opening for the nozzle in the external ramped opening element.

12. A vehicle system, comprising:
 an external body sheet material of the vehicle system, and
 a capless vehicle refueling port mounted into an opening of the body sheet material and having a drain tube at a bottom of the port and an articulating unitary plug that flexes due to nozzle insertion to rest upon and at least partially seal the drain tube, the plug captured between an external ramped opening element of the port and a filler pipe contiguously mounted to the external ramped opening element of the port, the drain tube leading vertically down with respect to gravity when the vehicle system is positioned with wheels of a vehicle on level ground, wherein a top of the drain tube is attached to a bottom end of the external ramped opening element of the port.

13. The system of claim 12, wherein the plug includes first and second snap-fit extensions that mate and snap into retention with corresponding openings in the external ramped opening element of the port.

14. The system of claim 13, wherein the corresponding openings in the external ramped opening element of the port are fully within ribs forming a ramp, the corresponding openings smaller than a main opening for a nozzle in the external ramped opening element of the port.

15. The system of claim 14, wherein the first and second snap-fit extensions extend longitudinally parallel to a central axis of the port, wherein the first and second snap-fit extensions straddle sides of a central vertical projection that projects up into a passage formed by the main opening, the central vertical projection having a curved top surface, the central vertical projection having first and second arms extending to connect integrally with the first and second snap-fit extensions, respectively, the first and second arms deflected downward by insertion of the nozzle, and wherein the central vertical projection is further integrally coupled to a rectangular plug cover via only a single arm with a reinforcing rib centrally located on the plug, the rectangular plug cover further having a downward projecting central ramp ramping downward in a direction of nozzle insertion.

16. The system of claim 15, wherein each of the first and second snap-fit extensions further comprises a downward extending flat L-shaped bent tab, the tabs engaging directly with a bottom of the corresponding openings in the external ramped opening element of the port to urge the first and second snap-fit extensions upward and retain the first and second snap-fit extensions.

17. The system of claim 13, wherein there is no additional spring coupling or interacting with the plug.

18. The system of claim 13, wherein the drain tube extends vertically downward at all points from a drain tube inlet sealed by the plug to a first 90 degree bend.

* * * * *